(12) United States Patent
Umemoto

(10) Patent No.: US 6,735,373 B2
(45) Date of Patent: May 11, 2004

(54) PLANE LIGHT SOURCE UNIT AND LIQUID-CRYSTAL DISPLAY DEVICE

(75) Inventor: Seiji Umemoto, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 72 days.

(21) Appl. No.: 09/734,721

(22) Filed: Dec. 13, 2000

(65) Prior Publication Data

US 2001/0006574 A1 Jul. 5, 2001

(30) Foreign Application Priority Data

Dec. 13, 1999 (JP) .......................................... P. 11-353141

(51) Int. Cl.[7] .................................................. G02B 6/00
(52) U.S. Cl. ........................ 385/146; 385/133; 385/147
(58) Field of Search .............................. 362/560, 582; 385/133, 146–147, 901

(56) References Cited

U.S. PATENT DOCUMENTS

| 5,727,107 A | | 3/1998 | Umemoto et al. .......... 385/116 |
| 5,835,661 A | * | 11/1998 | Tai et al. .................... 385/146 |
| 6,286,970 B1 | * | 9/2001 | Egawa et al. ................. 362/31 |

* cited by examiner

*Primary Examiner*—Akm Enayet Ullah
*Assistant Examiner*—Jerry T Rahll
(74) *Attorney, Agent, or Firm*—Westerman, Hattori, Daniels & Adrian, LLP

(57) ABSTRACT

There is provided a plane light source unit having a plane light pipe constituted by upper and lower surfaces and an incidence side surface which is one of side surfaces between the upper and lower surfaces, and a linear light pipe including a light supply surface. The linear light pipe has a refractive index higher than that of the plane light pipe. At least one point light source is disposed on the linear light pipe, and light incident from the at least one point light source is converted into light of a linear light source by the linear light pipe.

27 Claims, 1 Drawing Sheet

PLANE LIGHT SOURCE UNIT AND LIQUID-CRYSTAL DISPLAY DEVICE

BACKGROUND OF THE INVENTION

1. Field of the Invention

The present invention relates to a plane light source unit for converting light of at least one point light sources efficiently into light of a plane light source to thereby make it possible to form a transmission type or reflection type liquid-crystal display device, which is excellent in luminance and uniformity of luminance, and which is bright and easy to view.

The present application is based on Japanese Patent Application No. Hei. 11-353141, which is incorporated herein by reference.

2. Description of the Related Art

A side-lighting type plane light source unit having a light source disposed on a side surface of a light pipe having prismatic structures was heretofore known as a plane light source unit capable of forming a transmission type or reflection type liquid-crystal display device using a back-lighting or front-lighting system. Generally, a cold-cathode tube was used as the light source in such a side-lighting type plane light source unit. There was, however, a problem that the cold-cathode tube needed high power consumption so that the frequency of required battery exchanges was high when the plane light source unit was used portably.

In consideration of the above problem, there was a proposal to arrange point light sources such as light-emitting diodes on an incidence side surface of a light pipe. Incidentally, the light-emitting diodes had advantages in reduction of power consumption, reduction of space and weight due to no use of any inverter, measures against electromagnetic wave, etc. From the point of view of prevention of disorder of a display image, improvement of light emission efficiency, etc., it was, however, difficult to incorporate a light scattering mechanism in the aforementioned light source unit. Hence, there was a problem that a large difference occurred between brightness and darkness to cause poor uniformity of luminance, because light was emitted like a stripe emission-line pattern corresponding to the location of arrangement of the point light sources. There was another proposal to arrange a light-emitting diode on a side surface of a rod-like light pipe to thereby form a linear light source. Also in this case, there was a problem that contrast of a display image ran short because a great deal of surface reflection occurred particularly when the linear light source was applied to a front-lighting system.

SUMMARY OF THE INVENTION

An object of the present invention is to develop a plane light source unit, which is capable of efficiently converting light of at least one point light source into light of a plane light source, which is excellent in luminance and uniformity of luminance, and which is capable of constituting a transmission type or reflection type liquid-crystal display device bright and easy to view.

According to the present invention, there is provided a plane light source unit comprising: a plane light pipe constituted by upper and lower surfaces and an incidence side surface which is one of side surfaces between the upper and lower surfaces; and a linear light pipe including a light supply surface and having a refractive index higher than that of the plane light pipe; wherein at least one point light source is disposed on the linear light pipe, and light incident from the at least one point light source is converted into light of a linear light source by the linear light pipe; and wherein the linear light pipe is disposed so as to make the light supply surface of the linear light pipe face the incidence side surface of the plane light pipe, and light of the linear light source exiting from the light supply surface so as to be incident on the incidence side surface is converted into light of a plane light source by means of the plane light pipe. There is further provided a liquid-crystal display device at least comprising the plane light source unit and a liquid crystal cell.

According to the present invention, the refractive index of a plane light pipe is decreased to suppress surface reflection while the refractive index of a linear light pipe is increased to attain improvement of output efficiency due to effective utilization of incident light. Hence, light of point light sources is converted, through the linear light pipe, into light of a linear light source efficiently. The converted light of the linear light source is converted again through the plane light pipe to thereby form a plane light source efficiently. Hence, there can be obtained a plane light source unit which is excellent in luminance and uniformity of luminance and which needs low power consumption. When the plane light source unit is used as a back-lighting or front-lighting system, there can be obtained a transmission type or reflection type liquid-crystal display device which needs low power consumption and which is bright, easy to view and excellent in display quality.

Features and advantages of the invention will be evident from the following detailed description of the preferred embodiments described in conjunction with the attached drawings.

DETAILED DESCRIPTION OF THE PREFERRED EMBODIMENTS

Figure 1:
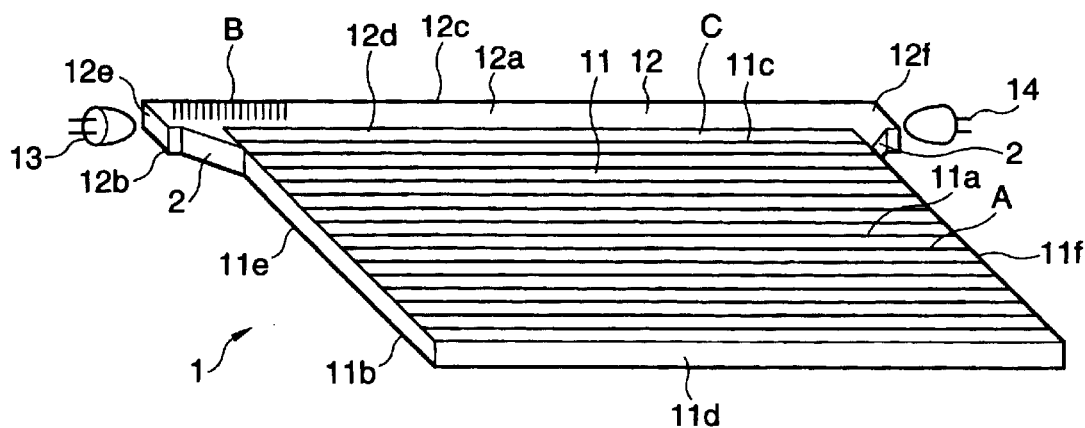
FIG. 1 is a perspective explanatory view of a plane light source unit.

According to the present invention, a plane light source unit comprises: a plane light pipe constituted by upper and lower surfaces and an incidence side surface which is one of side surfaces between the upper and lower surfaces; and a linear light pipe including a light supply surface and having a refractive index higher than that of the plane light pipe; wherein at least one point light source is disposed on the linear light pipe, and light incident from the at least one point light source is converted into light of a linear light source by the linear light pipe; and wherein the linear light pipe is disposed so as to make the light supply surface of the linear light pipe face the incidence side surface of the plane light pipe, and light of the linear light source exiting from the light supply surface so as to be incident on the incidence side surface is converted into light of a plane light source by means of the plane light pipe. FIG. 1 shows an example of the plane light source unit. The reference 1 designates a plane light source unit; 11, a plane light pipe; 12, a linear light pipe; and 13 and 14, point light sources.

A suitable plate capable of converting light incident from a linear light source, which is disposed on a side surface, into light of a plane light source can be used as the plane light pipe. The plane light pipe is generally made of a plate-like member at least having an upper surface 11a, a lower surface 11b opposite to the upper surface 11a, and an incidence side surface 11c as a side surface between the upper and lower surfaces 11a and 11b. A light output means A is provided in either one of the upper and lower surfaces of the plane light pipe so that light supplied from the incidence side surface to the one of the upper and lower surfaces is outputted toward the other one of the upper and lower surfaces by the light output means A. Incidentally, FIG. 1 shows the case where the light output means A is provided in the upper surface 11a so that light exits from the lower surface 11b. That is, FIG. 1 shows the case where the lower surface 11b as serves as a light exit surface.

The plane light pipe used preferably from the point of view of light utilizing efficiency, etc. is configured so that a light output means which is constituted by a repetitive structure of unevenness, especially constituted by a repetitive prismatic structures, having slopes capable of reflecting, especially totally reflecting light incident on the incidence side surface to control an optical path is provided in either one of the upper and lower surfaces of the plane light pipe. Hence, light can be made to exit from the light exit surface through the light output means with good directivity.

The repetitive structure of slopes for forming the light output means may be also constituted by convex or concave portions each having equal side surfaces. From the point of view of improvement of light utilizing efficiency, etc., it is preferable that the repetitive structure is constituted by convex or concave portions each at least having a combination of a slope or short side surface and a flat or long side surface. Incidentally, discrimination between convex portions and concave portions is made by whether the surface in which the light output means is formed is protruded (convex) or depressed The light output means preferable from the aforementioned point of view is configured so that light as large in quantity as possible exits from the light exit surface of the plane light pipe in a direction perpendicular (normal) to the reference plane and so that the direction of light leaking from the plane light pipe is prevented as sufficiently as possible from overlapping the direction of the exit light serving as display light when the plane light source unit is used as a front-lighting system for a reflection type liquid-crystal display device. If leaking light overlaps display light, the intensity of a display image is reduced so as to cause lowering of contrast easily.

The prismatic structures preferable from the point of view of exiting of light in a direction of a normal line and prevention of overlapping between leaking light and display light is constituted by a repetitive structure of prismatic structures each having a slope or short side surface inclined at an inclination angle in a range of from 35 to 45 degrees with respect to the reference plane on a side where no light output means is formed in the upper or lower surface of the plane light pipe, that is, on a side of the light exit surface, and a flat or long side surface inclined at an inclination angle of not larger than 10 degrees, especially at an inclination angle in a range of from 0 (exclusively) to 10 degrees.

The slopes or short side surfaces have a role of reflecting light incident on the slopes or short side surfaces among the light incident on the incidence side surface to thereby supply the reflected light to the light exit surface. Therefore, the short side surfaces, or the like, are formed as slopes facing the incidence side surface with a large inclination angle. In this case, by setting the inclination angle of the short side surfaces, or the like, to be in a range of from 35 to 45 degrees, transmission light can be reflected well perpendicularly to the light exit surface. Thus, output light favorable for display can be obtained efficiently.

From the point of view of total reflection based on Snell laws, suppression of leaking light, suppression of disturbance of visual recognition due to the leaking light, etc., the inclination angle of the short side surfaces, or the like, is preferably in a range of from 38 to 43 degrees, more preferably in a range of from 40 to 42 degrees. If the inclination angle of the short side surfaces, or the like, is smaller than 35 degrees, the direction of light exiting from the light exit surface has a large angle to the normal line. As a result, the quantity of light allowed to be effectively used for visual recognition is reduced so that brightness is apt to be lowered. On the other hand, if the inclination angle is larger than 45 degrees, the quantity of light leaking from the surface in which the light output means is formed is apt to be increased.

On the other hand, the flat or long side surfaces have a role of reflecting transmission light incidence on the flat or long side surfaces to thereby supply the reflected light to the short side surfaces, or the like. In addition, when the plane light source unit is used as a back-lighting system for a transmission type liquid-crystal display device, the flat or long side surfaces have another role of improving light utilizing efficiency through a reflection layer, or the like. When the plane light source unit is used as a front-lighting system for a reflection type liquid-crystal display device, the flat or long side surfaces have another role of transmitting a display image from a liquid-crystal cell. From the above point of view, it is preferable that the inclination angle of the long side surfaces, or the like, with respect to the reference plane of the light exit surface is in the aforementioned range.

From the above description, when transmission light at an angle larger than the inclination angle is incident on the long side surfaces, or the like. In this case, the incident light reflected at an angle more parallel to the light exit surface on the basis of the inclination angle of the long side surfaces, or the like, is incident on the short side surface, or the like. Hence, the incident light is reflected by the short side surfaces, or the like, so that the reflected light is well condensed by the aforementioned collimation and exits from the light exit surface.

As a result, in addition to transmission light directly entering the short side surfaces, or the like, transmission light which enters the long side surfaces, or the like, reflected by the long side surfaces, or the like, and then enters the short side surfaces, or the like, can be supplies to the light exit surface through the reflection by the short side surfaces, or the like. Hence, improvement of light utilizing efficiency can be attained correspondingly. Moreover, the angle of incidence of light which is reflected by the long side surfaces, or the like, and then enters the short side surfaces, or the like, can be kept constant. Hence,variation in reflection angle can be suppressed so that collimation/condensation of the exit light can be attained.

Hence, by adjusting the inclination angle of the slopes or short side surfaces and the inclination angle of the flat or long side surfaces in the prismatic structures constituting the light output means, high-grade directivity can be given to output light. Hence, light can be outputted in a direction perpendicular to the light exit surface or at an angle near the perpendicular direction.

If the inclination angle of the long side surfaces, or the like, in the above description is larger than 10 degrees, the rate of light incident on the long side surfaces, or the like, is lowered. As a result, light supply to a counter side surface 11d which is opposite to the incidence side surface 11c runs short, so that light emission is apt to be uneven. Moreover, with respect to the sectional shape of the plane light pipe, it becomes difficult to reduce the thickness of the counter side surface. As a result, the quantity of light incident on the prismatic structures is reduced, so that light emission efficiency is apt to be lowered. Incidentally, the inclination angle of the long side surfaces, or the like, maybe 0 degrees. However, from the point of view of the aforementioned performances such as condensation of output light based on collimation of transmission light, suppression of leaking light, or the like, the inclination angle of the long side surfaces, or the like, is preferably in a range of from 0 (exclusively) to 8 degrees, more preferably in a range of from 0 (exclusively) to 5 degrees.

From the point of view of visual recognition of a display image through the flat or long side surfaces of the plane light pipe, etc., the angle difference in inclination angles between the long side surfaces, or the like, is set preferably to be not larger than 5 degrees, more preferably not larger than 4 degrees, further preferably not larger than 3 degrees, and the difference in inclination angle between adjacent ones of the long side surfaces, or the like, is set preferably to be not larger than 1 degree, more preferably not larger than 0.3 degrees, further preferably not larger than 0.1 degrees, on the whole of the plane light pipe.

From the above description, the difference in inclination angle between the long side surfaces, or the like, can be prevented from having an influence on the display image transmitted through the long side surfaces, or the like, when the plane light source unit is used as a front-lighting system for a reflection type liquid-crystal display device. If the deflection in transmission angle of the long side surfaces varies largely in accordance with the place, the display image is apt to be unnatural. Particularly if the deflection difference between transmission images is large in the vicinity of adjacent pixels, the display image is apt to be remarkably unnatural.

The aforementioned angle difference in inclination angle is determined on the assumption that the inclination angle of the long side surfaces, or the like, is not larger than 10 degrees as described above. That is, the angle difference is determined on the assumption that deflection of the display image due to refraction of light transmitted through the long side surfaces, or the like, is suppressed to set the small inclination angle to be in an allowable range. This assumption is made for the purpose that the optimum viewing direction of the reflection type liquid-crystal display device optimized by setting a point of observation in a direction near the perpendicular direction is prevented from being changed.

From the point of view of obtaining a brighter display image, the light output means is constituted by prismatic structures in which the projected area of the long side surfaces, or the like, on the reference plane of the light exit surface is preferably not smaller than 8 times, more preferably not smaller than 10 times, further preferably not smaller than 15 times as large as that of the short side surfaces on the reference plane. Hence, when the plane light source unit is used as a front-lighting system for a reflection type liquid-crystal display device, a great part of the display image generated by the liquid-crystal cell can be transmitted through the long side surfaces, or the like. On the other hand, when the plane light source unit is used as a back-lighting system for a transmission type liquid-crystal display device, the area of the reflection surface can be kept large. This is favorable for improvement of light utilizing efficiency.

In consideration that the pixel pitch of the liquid-crystal cell is generally in a range of from 100 to 300 $\mu$m, and from the point of view of keeping the area of the long side surfaces, or the like, large enough to prevent occurrence of moire due to interference with the pixels of the liquid-crystal cell, formability of sharp prismatic structures, etc., each of the slopes or short side surfaces is set preferably to be not larger than 40 $\mu$m, more preferably in a range of from 3 to 20 $\mu$m, further preferably in a range of from 5 to 15 $\mu$m in terms of the projected width thereof on the reference plane of the light exit surface.

From the aforementioned point of view, it is preferable that the distance between adjacent ones of the short side surfaces, or the like, is large. As described above, however, the short side surfaces, or the like, serve as a functional portion for substantially outputting light incident on the side surface. Hence, if the distance is too large, illumination light becomes so sparse that display may be unnatural. In consideration of these facts, the repetition pitch of the prismatic structures is preferably set to be in a range of from 50 $\mu$m to 1.5 mm. Incidentally, the pitch may be irregular as represented by a random pitch or a random or regular combination of a predetermined number of pitch units. However, from the point of view of prevention of moire, external appearance, etc., it is preferable that the pitch is constant.

When the light output means is constituted by a repetitive structure of prismatic structures, moire may occur because of interference between the light output means and the pixels of the liquid-crystal cell. Although moire can be prevented by adjustment of the pitch of the prismatic structures, the pitch of the prismatic structures has the preferable range as described above. Hence, as measures against the case where moire occurs though the pitch is in the aforementioned preferable range, a method in which the prismatic structures are formed to be inclined with respect to the reference plane of the incidence side surface so that the prismatic structures can be arranged to cross the pixels is used preferably. On this occasion, if the inclination angle is too large, deflection occurs in reflection by the short side surfaces, or the like. As a result, large deviation occurs in the direction of output light. Hence, anisotropy in the intensity of light emission in the light-transmitting direction of the plane light pipe becomes large, so that light utilizing efficiency is reduced. This reduction is apt to cause lowering of display quality.

From the aforementioned point of view, the inclination angle of the direction of arrangement of the prismatic structures with respect to the reference plane of the incidence side surface, that is, the inclination angle of the ridgeline of the prismatic structures with respect to the reference plane is set preferably to be in a range of ±30 degrees, more preferably in a range of ±25 degrees, further preferably in a range of ±20 degrees. Incidentally, the symbol "±" means the direction of inclination with the incidence side surface as a reference. If moire is negligible, it is preferable that the prismatic structures are arranged to be as parallel with the incidence side surface as possible.

The plane light pipe can be provided as a suitable shape. Hence, the plane light pipe may be an equal thick plate as illustrated in the drawing. It is, however, preferable that the plane light pipe is shaped so that the counter side surface 11d opposite to the incidence side surface 11c is thinner than the incidence side surface 11c, especially not thicker than 50% as thick as the incidence side surface 11c. By reduction (wedge-shaping etc.) of the thickness of the counter side surface, the efficiency of light incident on the light output means can be improved.

That is, before reaching the counter side surface, light incident on the incidence side surface is efficiently incident on the light output means formed in one of the upper and lower surfaces, then reflected by the short side surfaces, or the like, and exits from the light exit surface which is the other one of the upper and lower surfaces. As a result, the incident light can be supplied to a target surface efficiently. There is another advantage in that the weight of the plane light pipe can be reduced by wedge-shaping, or the like. Incidentally, when the plane light pipe is shaped like a wedge constituted by linear surfaces, the weight of the plane light pipe can be reduced to about 75% as large as the weight of the uniform-thick plane light pipe.

The plane light pipe can be formed into a suitable surface shape also in the case where it is shaped like a wedge, etc. as described above. The surface shape can be determined suitably. For example, a suitable surface shape such as a linear surface, a folded surface, a curved surface, etc., can be used. Further, the slopes in the prismatic structures constituting the light output means may be formed into a suitable surface shape such as a linear surface, a folded surface, a curved surface, etc. Further, the prismatic structures may be constituted by repetition of a combination of prismatic structures different in shape, etc. in addition to pitch. In addition, the prismatic structures maybe formed as a series of convex or concave portions having ridgelines continuously connected to one another or may be formed as intermittent convex or concave portions discontinuously arranged at intervals of a predetermined distance in the direction of the ridgeline.

The light exit surface of the plane light pipe, that is, the upper or lower surface having no light output means is generally provided as a flat surface. However, when the plane light source unit is used as a front-lighting system for a reflection type liquid-crystal display device so that the plane light pipe is viewed from the upper surface, the light output means may interfere with a pattern of the light output means displayed on the light exit surface in the direction of viewing so that a moire phenomenon occurs due to the interference stripe. To prevent lowering of display quality due to the moire, the light exit surface may have a surface structure in which fine prismatic structures are provided as occasion demands.

The fine prismatic structures in the light exit surface can be formed by a suitable method similar to the formation of the background-art diffusing layer. Examples of the method include a surface roughening method using matting such as sandblasting etc.; a method forgiving fine prismatic structures by a mold, or the like, when the plane light pipe is formed; a method for applying a resin layer containing transparent particles; a method for providing diffusing dots on the plane light pipe or for providing a sheet having diffusing dots on the plane light pipe, etc.

Also the shape of the incidence side surface 11c of the plane light pipe may be determined suitably without any particular limitation. From the point of view of arrangement of the linear light pipe etc., the incidence side surface 11c may be generally provided as a surface perpendicular to the light exit surface.

On the other hand, the linear light pipe may be made of a suitable material that can convert incident light from point light sources into light of a linear light source and can be connected to the plane light pipe, especially can be partially connected to the plane light pipe. Generally, the linear light pipe is made of a rod-like member having at least six surfaces, namely, upper and lower surfaces 12a and 12b, front and rear surfaces 12c and 12d and left and right surfaces 12e and 12f, and having, at the front surface 12c, an optical path changing means B by which incident light (13, 14) on one or both of the left and right surfaces 12e and 12f exits from a light supply surface constituted by the rear surface 12d as illustrated in FIG. 1.

The linear light pipe used preferably from the point of view of efficient entrance of the thus formed light of the linear light source into the plane light pipe, etc. is configured so that the optical path changing means B is formed at the front surface 12c of the rectangular parallelepiped 12 to have slopes in the front-rear direction as shown in FIG. 1. The slopes face the left or right surface 12e or 12f for receiving light from one or both of the point light sources 13 and 14 and are inclined with respect to a reference plane of the rear surface 12d serving as the light supply surface.

From the above description, light received in one or both of the left and right surfaces 12e and 12f of the linear light pipe from the point light sources 13 and 14 is efficiently made incident on the slopes of the optical path changing means formed in the direction between the upper and lower surfaces 12a and 12b. Then, the incident light is reflected by the slopes, so that the optical path is changed through the reflection. As a result, the light efficiently exits from the light supply surface constituted by the rear surface 12d, with good directivity. In this case, from the point of view of making light exit toward the front surface of the plane light pipe with good directivity, it is preferable that light is supplied to the incidence side surface of the plane light pipe at an angle of not larger than 30 degrees.

Hence, the deflection angle of light due to the change of the optical path through the slopes is preferably in a range of from about 70 to about 90 degrees. Total reflection is preferably from the point of view of efficient reflection at such a large deflection angle. From the point of view of total reflection, it is preferable that the slopes of the optical path changing means face the left or right surface 12e or 12f of the linear light pipe serving as an incident surface and have an inclination angle in a range of from 35 to 45 degrees with respect to the reference plane of the rear surface 12d serving as a light supply surface.

The optical path changing means may be formed by a method of providing the whole of the front surface of the linear light pipe as the aforementioned slopes. However, from the point of view of reducing the depth in the direction between the front and rear surfaces to improve light output efficiency, etc., it is preferable that the slopes are formed as a repetitive structure of prismatic structures in the front surface of the linear light pipe. Each of the prismatic structures has a sectional structure of a triangle, a trapezoid or a polygon. That is, the prismatic structures have the slopes for changing the optical path of light incident on the left and right side surfaces to turn the incident light to the light supply surface (rear surface), and flat surfaces for transmitting the incident light to the other end of the left and right side surfaces. When point light sources are disposed on the left and right surfaces of the linear light pipe, it is preferable from the point of view of uniformity of exit light that the slopes are provided with respect to the left and right surfaces by use of a sectional structure etc. of isosceles triangles or trapezoids.

From the point of view of preventing the angle of transmission light from changing remarkably, it is preferable that other portions than the slopes such as upper sides etc. of trapezoids are provided as flat surfaces having an inclination angle of not larger than 10 degrees with respect to the reference plane of the light supply surface (rear surface). Hence, in consideration of the function of the optical path changing means, the optical path changing means can be also formed by a method in which a repetitive structure of prismatic structures each having a slope inclined at an inclination angle in a range of from 35 to 45 degrees in accordance with the light output means of the plane light pipe, and a flat surface inclined at an inclination angle of not larger than 10 degrees is provided so that the direction of the ridgelines of the prismatic structures is located in the direction between the front and rear surfaces 12a and 12b of the linear light pipe. In this case, the surface of the linear light pipe in which the optical path changing means is provided may be provided as wedge-like surfaces in accordance with the plane light pipe.

The repetition pitch of the prismatic structures for forming the optical path changing means is not particularly limited. From the point of view of uniformity of output light, the pitch is set preferably to be not larger than 1.5 mm, more preferably not larger than 1.0 mm, further preferably not larger than 0.5 mm. Incidentally, the pitch may be constant or may be irregular as represented by a random pitch, or a random, regular combination of a predetermined number of pitch units, or a gradually changed pitch.

The shapes of the upper and lower surfaces 12a and 12b, the rear surface 12d and the left and right surfaces 12e and 12f in the linear light pipe may be determined suitably without any special limitation. Generally, these surfaces are provided as flat surfaces from the point of view of arrangement of the linear light pipe with respect to the plane light pipe. Incidentally, the rear surface 12d of the linear light pipe serving as the light supply surface may be provided as a diffuse surface structure in which fine prismatic structures are provided in accordance with the plane light pipe as occasion demands. Generally, from the point of view of keeping the directivity of output light high, it is preferable that the rear surface 12d is provided as a smooth surface. Incidentally, a suitable reflector or reflection layer made of a white film or a silver layer may be disposed on the back of the optical path changing means-forming surface of the linear light pipe so that leaking light can enter the linear light pipe again.

The plane light source unit according to the present invention is configured so that the linear light pipe is made of a material having a refractive index higher than that of the plane light pipe. Hence, the plane light pipe or the linear light pipe can be made of a suitable material exhibiting transparency and having a target refractive index in accordance with the wavelength range of the light source. Incidentally, examples of the material used in a visible light range include transparent resin represented by acrylic resin, polycarbonate resin, polyester resin, norbornene resin, polyolefin resin or epoxy resin; glass; etc. A light pipe made of a material exhibiting no birefringence or small birefringence may be used preferably as the surface or linear light pipe.

From the point of view of prevention of light leakage, total reflectivity, output angle, efficiency and transmission angle due to the total reflectivity, etc., the surface or linear light pipe is favorably made of a high-refractive-index material. Incidentally, when the refractive index is 1.5, the angle of transmission light due to the total reflection is set to be in a range of ±41.8 degrees. When the refractive index becomes 1.6, the angle of transmission light is set to be in a range of ±38.7 degrees. That is, condensation of transmission light increases as the range is narrowed by 3.1 degrees.

Further, as the refractive index increases, the total reflection angle becomes wider and the output efficiency becomes higher. If the refractive index is low, loss increases because the quantity of light transmitted without total reflection increases.

On the other hand, as the refractive index increases, reflection loss on the surface of the light pipe increases. The reflectivity R is calculated by $R=\{(n1-n2)/(n1+n2)\}^2$ in which n1 is the refractive index of the light pipe, and n2 is the refractive index of an atmosphere (usually, air) being in contact with the light pipe. Hence, from the point of view of reduction of surface reflection, it is favorable that the light pipe is made of a low-refractive-index material contrariwise to the above description. Particularly when the light pipe unit constituted by the surface and linear light pipes is applied to a front-lighting system, surface reflection undesirably causes lowering of contrast of display light.

Hence, from the point of view of balance of total reflection efficiency, output efficiency, etc. with surface reflection as described above, the plane light pipe is made of a material exhibiting a refractive index of, preferably, not higher than 1.54, more preferably not higher than 1.52, further preferably not higher than 1.50. From the point of view of suppression of light leakage, output efficiency, etc., it is preferable that the plane light pipe is made of a material exhibiting a refractive index of not lower than 1.45.

On the other hand, because giving priority to total reflectivity, output efficiency, etc. is favorable to the linear light pipe, the linear light pipe is made of a material exhibiting a refractive index of, preferably, not lower than 1.55, more preferably not lower than 1.56, further preferably not lower than 1.58. From the point of view of preventing output efficiency from lowering by suppression of absorption of blue light, it is preferable that the linear light pipe is made of a material exhibiting a refractive index of not higher than 1.65.

The plane light pipe or the linear light pipe can be formed by a suitable method such as a cutting method. Examples of the production method preferable from the point of view of mass production etc. include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, ultraviolet rays, radial rays, etc. is polymerized in the condition that the fluid resin is cast in a mold capable of forming a predetermined shape or in the condition that a mold capable of forming a predetermined shape is filled with the fluid resin; and so on.

Incidentally, the plane light pipe or the linear light pipe need not be formed as a monolithic single-layer plate made of one kind of material. For example, the surface or linear light pipe may be formed as a laminate of parts made of one kind of material or different kinds of materials. For example, the surface or linear light pipe may be provided as a plate in which a sheet having a light output means such as prismatic structures, an optical path changing means or/and fine prismatic structures (light exit surface, light supply surface) adheres to a light guide portion for performing transmission of light.

The thickness of the plane light pipe or the linear light pipe can be determined suitably in accordance with the size of the plane light pipe, the size of the point light source, etc. based on the purpose of use. Generally, the thickness of the plane light pipe used for forming a transmission type or reflection type liquid-crystal display device, or the like, is not larger than 20 mm, particularly in a range of from 0.1 to 10 mm, more particularly in a range of from 0.5 to 8 mm in terms of the thickness of the incidence side surface. Generally, from the point of view of efficiency of light entrance into the plane light pipe, etc., the thickness of the linear light pipe is set to be in a range of from a value equal to the thickness of the incidence side surface of the plane light pipe to 2 times as large as the thickness of the incidence side surface of the plane light pipe in terms of the thickness of the light supply surface (rear surface) of the linear light pipe.

The plane light source unit is disposed so that the incidence side surface of the plane light pipe and the light supply surface of the linear light pipe face each other. As illustrated in FIG. 1, in the arrangement of the plane light source unit, it is preferable that a clearance C is interposed between the incidence side surface 11c of the plane light pipe 11 and the light supply surface (rear surface) 12d of the linear light pipe 12 because output light from the linear light pipe into the incidence side surface of the plane light pipe at a large angle is totally reflected to thereby improve directivity of light incident on the plane light pipe.

The plane light pipe and the linear light pipe may be disposed separately in a non-connected state or may be integrated with each other by a suitable method such as a boning method using an adhesive agent or a partial connection method using a connecting rod. Such integration permits the plane light pipe and the linear light pipe to be integrally handled. Hence, the number of assembling parts can be reduced. Moreover, any separate mechanism for holding the linear light pipe is not required. Moreover, the light supply surface of the linear light pipe can be positioned with high accuracy on the incidence side surface of the plane light pipe. Thus, such integration has an advantage in that incidence efficiency of output light from the linear light pipe can be improved.

The connection portion and structure for connecting the plane light pipe and the linear light pipe to each other can be determined suitably without any particular limitation. In FIG. 1, the light supply surface 12d of the linear light pipe 12 is partially connected, through connecting rods 2, to the side surfaces 11e and 11f adjacent to the incidence side surface 11c of the plane light pipe 11.

As illustrated in FIG. 1, the plane light source unit can be formed by arrangement of one or two point light sources 13 and 14 on the linear light pipe 12 of the light guide unit 1, particularly on one or both of the left and right surfaces 12e and 12f of the linear light pipe 12. Hence, the plane light source unit can be preferably used as a side-lighting type back-lighting or front-lighting system in a transmission type or reflection type liquid-crystal display device, etc. From the point of view of preventing the production of shade (difference between brightness and darkness) in end portions of the plane light pipe etc., it is preferable to use a linear light pipe having an effective emission length larger than the length of the plane light pipe in the longitudinal direction of the incidence side surface.

A suitable material such as a light-emitting diode exhibiting light emission characteristic in monochromatic light or in various wavelength ranges can be used as each point light source in accordance with the purpose of use of the plane light source unit. When a plurality of point light sources are used, different light emission colors may be selected as a combination of different colors in light emission. The plane light source unit used for forming a liquid-crystal display device preferably exhibits light emission characteristic in a visible light wavelength range which is as wide as possible.

The number of point light sources disposed on the left and right surfaces of the linear light pipe can be determined suitably in accordance with the area of the left and right surfaces, etc. As occasion demands, the point light sources may be arranged in parallel so that the point light sources can be controlled to be repeatedly flashed by a suitable method of applying AC of rectangular wave, sine wave, or the like, through an AC power supply. In this case, a pseudo continuous light emission state in which blinking is not perceived can be made by controlling the flashing cycle, so that greater reduction of power consumption can be achieved.

When the plane light source unit is formed, suitable assisting means such as a light source holder for enclosing the linear light pipe to lead light leaking from the linear light pipe to the incidence side surface of the plane light pipe may be arranged as occasion demands. A resin sheet coated with a high-reflectance metal thin film, a sheet of metal foil, a white sheet, or the like, is generally used as the light source holder. When the plane light source unit is used as a back-lighting system, the light source holder may be extended to the light exit surface of the plane light pipe so that the light source holder can also serve as a reflection sheet.

The plane light source unit according to the present invention provides a plane light source excellent in brightness because the plane light source unit utilizes light from the point light sources efficiently. It is also easy to increase the area of the plane light source unit. Hence, the plane light source unit can be preferably applied to various devices such as a back-lighting system for a transmission type liquid-crystal display device, a front-lighting system for a reflection type liquid-crystal display device, or the like. Particularly the plane light source unit can be used preferably in a portable device such as a portable telephone set, an electronic notebook, a PDA, or the like, which may use a battery such as a storage battery as a motive power source so that low power consumption can function favorably.

Figure 2:
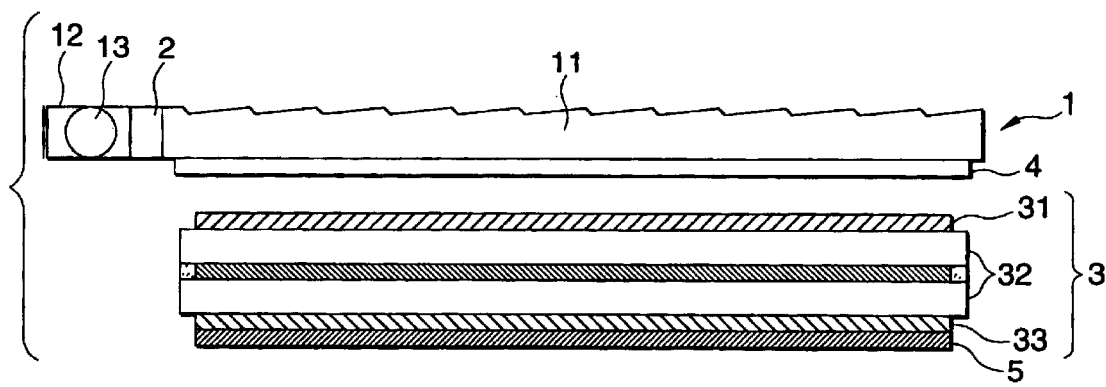
FIG. 2 is an explanatory view of a reflection type liquid-crystal display device using a front-lighting system.

FIG. 2 shows an example of a reflection type liquid-crystal display device using the plane light source unit as a front-lighting system. A reflection type liquid-crystal display unit 3 having polarizers 31 and 33 on both the front and back sides of a liquid-crystal cell 32 and further having a reflection layer 5 on the back side of the polarizer 33 is arranged through a light diffusing layer 4 on the light exit surface side of the plane light pipe 11 in the plane light source unit. In such a manner, the reflection type liquid-crystal display device is formed. When the plane light source unit is switched off, the liquid-crystal display device can serve as a reflection type liquid-crystal display device using external light.

Figure 3:
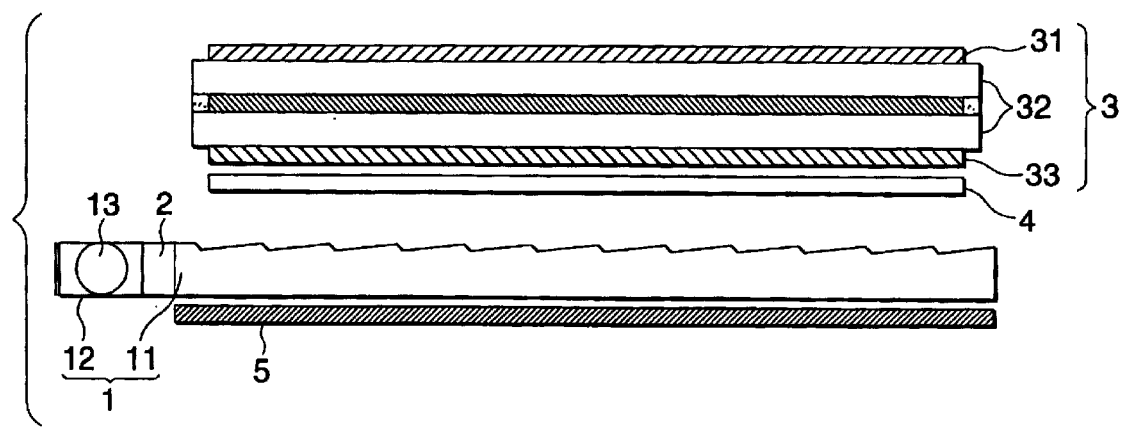
FIG. 3 is an explanatory view of a transmission type (reflection-transmission double type) liquid-crystal display device using a back-lighting system.

On the other hand, FIG. 3 shows an example of a liquid-crystal display device using the plane light source unit as a back-lighting system. A liquid-crystal display unit 3 is disposed through a light diffusing layer 4 on the upper side of the plane light pipe 11 in the plane light source unit. In such a manner, the liquid-crystal display device is formed. The light guide unit 1 has a reflection layer 5 on the light exit surface of the plane light pipe 11. Hence, the liquid-crystal display device can serves as not only a reflection type liquid-crystal display device but also a reflection-transmission double type liquid-crystal display device.

As shown in FIGS. 2 and 3, the liquid-crystal display device is at least constituted by the plane light source unit and the liquid-crystal cell and is formed by arrangement of the liquid-crystal cell on a predetermined surface side of the plane light pipe 11 in the plane light source unit. On this occasion, in the reflection type liquid-crystal display device using the plane light source unit as a front-lighting system, the plane light source unit 2 is arranged on the upper side (visual side) of the liquid-crystal display unit 3 having the reflection layer 5 on its back as shown in FIG. 2 so that the light output means-forming surface of the plane light pipe 11 is positioned on the upper side (visual side).

Hence, to the reflection type liquid-crystal display device using a front-lighting system, it is essential that at least the liquid-crystal layer of the liquid-crystal cell is positioned between the plane light pipe of the plane light source unit and the reflection layer so that the light output means-forming surface of the plane light pipe is disposed on the visual side. The visual recognition is performed as follows. External light transmitted from outside through the plane light pipe of the plane light source unit or light exiting from the plane light pipe at the time of switching-on is transmitted through the liquid-crystal cell and then turned over by the reflection layer. The turned-over light is transmitted through the liquid-crystal cell again and further transmitted through the plane light pipe. In this manner, the visual recognition is performed. Incidentally, the reflection layer may be attached to a cell substrate, or the like, so that the reflection layer can be provided inside the liquid-crystal cell.

On the other hand, in the transmission type liquid-crystal display device using the plane light source unit as a back-lighting system as shown in FIG. 3, the plane light pipe of the plane light source unit is disposed on the back side (the side opposite to the visual side) of the liquid-crystal cell. When the liquid-crystal display device is of a reflection-transmission double type, the plane light pipe of the plane light source unit is disposed between the liquid-crystal cell and the reflection layer. In these cases, the light output means-forming surface side of the plane light pipe in the plane light source unit may be disposed at the liquid-crystal cell side as shown in FIG. 3 or the light exit surface side of the plane light pipe having no light output means may be disposed at the liquid-crystal cell side, contrary to FIG. 3.

In the method in which the light output means-forming surface side of the plane light pipe is disposed at the liquid-crystal cell side and light is turned over by the reflection layer disposed on the light exit surface as shown in FIG. 4, the optical path length of light incident from the light output means to the liquid-crystal cell is increased so that the emission-line pattern can be moderated by the light output means. This method has an advantage in that occurrence of display failure such as moire etc. can be suppressed in comparison with the method, contrary to the FIG. 3, in which the light exit surface side of the plane light pipe is disposed at the liquid-crystal cell side.

Visual recognition of the transmission type liquid-crystal display device is performed as follows. Light exiting from the plane light source unit enters the liquid-crystal cell directly or through turn-over at the reflection layer, so that the light is transmitted through the liquid-crystal cell. On the other hand, visual recognition of the reflection-transmission double type liquid-crystal display device is performed as follows. In a transmission mode, visual recognition is performed in the same manner as in the transmission type liquid-crystal display device. In a reflection mode, external light is transmitted through the liquid-crystal cell and turned over by the reflection layer on the back side of the plane light pipe. The turned-over light is transmitted through the plane light pipe and the liquid-crystal cell again. Thus, visual recognition in the reflection mode is performed.

Generally, the liquid-crystal display device is formed by assembling a liquid-crystal display unit including a liquid-crystal cell 32 having a transparent electrode functioning as a liquid-crystal shutter as shown in FIGS. 2 and 3, a driver attached to the liquid-crystal cell 32, a polarizer, etc.; by assembling a back-lighting or front-lighting system including a change-over switch for changing over light-on/off as occasion demands; and by assembling constituent parts such as a light diffusing layer 4, a reflection layers, an anti-reflection layer, a compensatory phase retarder, etc. suitably as occasion demands.

In the present invention, the liquid-crystal display device can be formed, as illustrated in the drawings, in the same manner as in the background art without any particular limitation except that the aforementioned light pipes or the plane light source unit is used. Hence, the liquid-crystal cell used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell, or the like. Further, the method for driving liquid crystal is not particularly limited. For example, a suitable drive method such as an active matrix method or a passive matrix method may be used.

Incidentally, in FIGS. 2 and 3, the liquid-crystal cell 32 has a liquid-crystal layer enclosed in cell substrates. In this case, one of the cell substrates may serve as the light pipe unit constituted by the surface and linear light pipes or as the plane light pipe of the light pipe unit according to the present invention. In FIGS. 2 and 3, a transparent electrode and a driver attached to the liquid-crystal cell 32 are not shown.

The polarizer provided on one or each of the front and back sides of the liquid-crystal cell is not particularly limited. Particularly from the point of view of obtaining good-contrast-ratio display based on incidence of high-grade linearly polarized light, etc., a material high in the degree of polarization such as an absorption type linear polarizer of iodine, dye, or the like, can be used preferably as the back-lighting side or front-lighting side polarizer.

The reflection layer can be formed as a suitable reflection layer according to the background art. Examples of the reflection layer include: a coating layer containing powder of a high-reflectance metal such as aluminum, silver, gold, copper or chromium in a binder resin; a layer of a metal thin film deposited by a vapor deposition method, or the like; a reflection sheet having the coating or deposited layer supported by a base material; a sheet of metal foil; and so on. When the reflection layer is provided inside the liquid-crystal cell, the reflection layer is preferably formed by a method of forming an electrode pattern of a high electrically conductive material such as a high-reflectance metal as described above or by a method of providing a transparent electrode pattern on the reflection layer of a high-reflectance metal film through an electrically insulating layer.

Incidentally, the reflection layer in the reflection type liquid-crystal display device may be provided outside the liquid-crystal cell, for example, in the condition that a reflection layer made of a high-reflectance metal film is provided on a plastic film. In the case of a transmission type liquid-crystal display device, the reflection layer may be directly attached to the plane light pipe for forming a back-lighting system. The reflection layer can be provided on either the light output means-forming surface or the light exit surface of the plane light pipe in accordance with the mode of use of the light pipe by a suitable method as described above.

When the liquid-crystal display device is formed, suitable optical devices such as an anti-glare layer or an anti-reflection film provided on the visual side surface, a light diffusing plate, a compensatory phase retarder, a polarization separating plate, a prism sheet for controlling an optical path, etc. can be disposed in suitable positions respectively as described above. Incidentally, the anti-reflection film may be provided on the light exit surface of the plane light pipe, etc.

The compensatory retarder plate is provided to compensate for wavelength dependence of birefringence, or the like, so as to attain improvement of visibility, or the like. The compensatory phase retarder is disposed between the visual side polarizer and/or the liquid-crystal cell and between the back-lighting side polarizer and the liquid-crystal cell as occasion demands. A suitable plate in accordance with the wavelength range can be used as the compensatory phase retarder. The compensatory retarder plate can be obtained as a birefringent sheet made of a stretched film of polycarbonate, polysulfone, polyester, polymethyl methacrylate, polyamide, polyvinyl alcohol, or the like. Alternatively, the compensatory phase retarder may be formed as a laminate of two layers or more of the phase-difference sheets.

The light diffusing layer is provided to obtain surface light emission of uniform brightness based on prevention of unevenness in brightness, to reduce moire based on mixture of adjacent light rays, etc. One light diffusing layer may be disposed in a suitable position of the liquid-crystal display device or a plurality of light diffusing layers maybe disposed in suitable positions of the liquid-crystal display device as occasion demands. Incidentally, in FIGS. 2 and 3, the light diffusing layer 4 is disposed between the light pipe unit 1, which is constituted by the surface and linear light pipes, and the liquid-crystal display unit 3. Incidentally, from the point of view of keeping the directivity of light exiting from the plane light pipe, etc., a diffusing layer having a narrow diffusing range can be used preferably.

The light diffusing layer can be formed by a suitable method in accordance with the fine prismatic structures of the light exit surface. Examples of the method include: a method of applying and curing a low-refractive-index transparent resin containing high-refractive-index transparent particles dispersed therein; a method of applying and curing a transparent resin containing air bubbles dispersed therein; a method of swelling a surface of a base material by a solvent to thereby generate a craze; a method of forming a transparent resin layer having an irregular rough surface; a method using a diffusing sheet formed in the aforementioned manner; etc.

Incidentally, when the transmission type liquid-crystal display device is formed, a polarization separating plate may be disposed between the plane light source unit and a polarizer in order to improve luminance. The polarization separating plate has a function of separating natural light into polarized light through transmission and reflection. The polarization separating plate is represented, for example, by a sheet having a layer having a cholesteric liquid-crystal phase, particularly having a layer made of a liquid-crystal polymer exhibiting a cholesteric phase, or by a dielectric multilayer film provided on a transparent substrate. Incidentally, according to the cholesteric liquid-crystal phase, light can be separated into left and right circularly polarized light groups through transmission and reflection.

According to the dielectric multilayer film, light can be separated into linearly polarized P-wave and S-wave light groups through transmission and reflection. Further, the circularly polarized light can be converted into linearly polarized light through a quarter-wavelength plate.

Therefore, when polarized light transmitted through the polarization separating plate is made incident on a polarizer plate while the axes of polarization are made as coincident as possible, absorption loss due to the polarizer can be suppressed so that improvement of luminance can be achieved. In the plane light source unit constituted by the light guide unit 1 having the reflection layer 5 on its back side as shown in FIG. 3, polarized light reflected by the polarization separating plate can be turned over by the reflection layer 5 and made to enter the polarization separating plate again. Hence, the turned-over light can be partially or wholly transmitted, so that improvement of luminance can be achieved by the improvement in light utilizing efficiency.

In the present invention, optical devices or parts such as a light pipe for forming the plane light source unit or the liquid-crystal display device, a liquid-crystal cell, a polarizer, etc. may be wholly or partially integrally laminated/fixed onto one another or may be disposed separably. From the point of view of prevention of lowering of contrast by suppression of interface reflection, etc., it is preferable that such optical devices or parts are fixed onto one another. A suitable transparent adhesive such as a tackifier can be used for the close fixing process.

EXAMPLE 1

A mold processed into a predetermined shape in advance was filled with hot-melted polymethyl methacrylate (PMMA) of high fluidity. Then, the PMMA was cooled to obtain a plane light pipe having a refractive index of 1.49. The plane light pipe was made of a plate-like member which was 40 mm wide and 25 mm deep and which had an incidence side surface 1 mm thick and a counter side surface 0.6 mm thick. The plane light pipe had upper and lower surfaces, and, in the upper surface, there were provided prismatic structures. The prismatic structures were arranged at intervals of a pitch of 210 μm in parallel with the incidence side surface. Each of the prismatic structures had a short side surface facing the incidence side surface, and a long side surface. The respective inclination angles of the short side surfaces changed in a range of from 42.5 to 43 degrees. The respective inclination angles of the long side surfaces changed in a range of from1.8 to3.5 degrees. The inclination angle difference between adjacent ones of the long side surfaces was not larger than 0.1 degrees. The projected width of each of the short side surfaces on the lower surface of the plane light pipe was in a range of from 10 to 16 μm. The ratio of the projected area of the long side surfaces on the lower surface to the projected area of the short side surfaces on the lower surface was not smaller than 12. The formation ofthe prismatic structures was started from a position distanced by 2 mm from the incidence side surface.

On the other hand, a linear light pipe was obtained by use of high-fluidity polycarbonate (PC) having a refractive index of 1.585. In accordance with the size of the plane light pipe, the linear light pipe was made of a rectangular parallelepiped which was 43 mm wide (left-right direction), 2.4 mm deep (front-rear direction) and 1.2 mm thick (up-down direction). The linear light pipe had optical path changing means made of prism-like grooves in its front surface in the front-rear direction. Each of the prism-like grooves was constituted by a combination of a steep slope and a gentle slope. Each of the prism-like grooves had a vertical angle of 94 degrees and a depth of 20 μm. The prism-like grooves were disposed at intervals of a pitch of 200 μm on the whole of the front surface.

A triacetyl cellulose film coated with an anti-reflection layer was bonded to the lower surface of the plane light pipe through a tacky layer so that the anti-reflection layer was positioned on the outside. Then, the light supply surface (rear surface) of the linear light pipe was butt-arranged to face the incidence side surface of the plane light pipe. Two white light-emitting diodes were disposed in respective center portions of the left and right surfaces of the linear light pipe by a method of fixing the periphery of each light-emitting diode to the left and right surfaces respectively by an adhesive tape. The light-emitting diodes were connected to a DC power supply. Thus, a plane light source unit was obtained. Then, a normally white reflection type liquid-crystal display unit was disposed on the light exit surface (lower surface) side of the plane light source unit. Thus, a reflection type liquid-crystal display device using a front-lighting system was obtained. That is, the light pipe unit constituted by the surface and linear light pipes was disposed so that the light output means-forming surface of the plane light pipe was located on the visual side.

EXAMPLE 2

A plane light source unit and a reflection type liquid-crystal display device using a front-lighting system were obtained in the same manner as that in Example 1 except that the plane light pipe was made of a norbornene resin having a refractive index of 1.52.

Comparative Example 1

A plane light source unit and a reflection type liquid-crystal display device using a front-lighting system were obtained in the same manner as that in Example 1 except that the linear light pipe was also made of PMMA.

Comparative Example 2

A plane light source unit and a reflection type liquid-crystal display device using a front-lighting system were obtained in the same manner as that in Example 1 except that the plane light pipe was also made of PC.

Evaluation Test

The light emission state of the reflection type liquid-crystal display device obtained in each of Examples and Comparative Examples was observed in the condition that the plane light source unit was switched on while the liquid-crystal cell was supplied with no voltage. Frontal luminance in the center of a display screen was measured by a luminance meter (BM-7 made by TOPCON Corp.). Further, the white state and black state of the liquid-crystal display device were observed in the condition that the plane light source unit was switched off while a ring-like illumination lamp disposed at a position distanced by 20 cm was switched on.

Results of the aforementioned measurement were shown in the following Table.

|  | Example 1 | Example 2 | Comparative Example 1 | Comparative Example 2 |
|---|---|---|---|---|
| Luminance ($cd/m^2$) | 24 | 26 | 16 | 31 |

It is apparent from Table that Examples 1 and 2 and Comparative Example 2 exhibit good brightness whereas Comparative Example 1 is inferior in brightness in the switched-on state of the plane light source unit. It is conceived that light output efficiency is improved because the linear light pipe in each of Examples 1 and 2 and Comparative Example 2 is brighter than that in Comparative Example 1 and has a refractive index higher than that in Comparative Example 1.

On the other hand, in an external light mode using the ring-like illumination lamp, a high contrast ratio is obtained in each of Examples 1 and 2 and Comparative Example 1, so that display is easy to view. In Comparative Example 2, display is bright even in the black state so that contrast ratio is poor to make it difficult to view the display. This is because the plane light pipe in each of Examples 1 and 2 and Comparative Example 1 is small in surface reflection whereas the plane light pipe in Comparative Example 2 is so large in surface reflection that the display screen glares because of reflection of the illumination lamp. It is conceived that the above result was caused by lower level setting of the refractive index of the plane light pipe.

It is proved from the above description that, in the plane light source unit according to the present invention, point light sources can be converted into a uniform plane light source easily to thereby make it possible to form a reflection type or transmission type liquid-crystal display device which uses a front-lighting or back-lighting system and which is excellent in uniformity of light emission and good in display property.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A plane light source unit comprising:
   a plane light pipe including upper and lower surfaces and an incidence side surface which is one of side surfaces between said upper and lower surfaces; and
   a linear light pipe including a light supply surface and having a refractive index higher than that of said plane light pipe; and
   at least one point light source being disposed on said linear light pipe,
   wherein light incident from said at least one point light source is converted into light of a linear light source by said linear light pipe, and
   wherein said linear light pipe is disposed so as to make said light supply surface face said incidence side surface of said plane light pipe, and light of said linear light source exiting from said light supply surface so as to be incident on said incidence side surface is converted into light of a plane light source by means of said plane light pipe.

2. A plane light source unit according to claim 1, wherein said plane light pipe includes light output means in one of said upper and lower surfaces to make light incident on said incidence side surface be outputted from the other of said upper and lower surfaces, and said linear light pipe is constituted by a rod-like member having at least six surfaces, namely, upper and lower surfaces, front and rear surfaces and left and right surfaces and further having an optical path changing means in said front surface to thereby make light incident from at least one point light source at either or both of the left and right surfaces exit from said light supply surface constituted by said rear surface.

3. A plane light source unit according to claim 2, wherein said light output means of said plane light pipe is constituted by a repetitive structure of prismatic structures each having a combination of a short side sutface and a long side surface and disposed at intervals of a pitch of from 50 $\mu$m to 1.5 mm; each of said short side surfaces is made of a slope facing said incidence side surface at an inclination angle in a range of from 35 to 45 degrees with respect to a reference plane of a light exit surface on a side opposite to said upper or lower surface having said light output means; and each of said long side surfaces is made of a slope inclined with respect to said reference plane so that the inclination angle is in a range of from 0 exclusively to 10 degrees, so that the inclination angle difference is not larger than 5 degrees and the inclination angle difference between adjacent ones of said long side surfaces is not larger than 1 degree on a whole surface of said plane light pipe, and so that the projected area of the long side surfaces on said reference plane is not smaller than 8 times as large as the projected area of the short side surfaces on said reference plane.

4. A plane light source unit according to claim 2, wherein said optical path changing means has slopes facing the left or right surface and being inclined in the front-rear direction at an angle in a range of from 35 to 45 degrees with respect to a reference plane of said light supply surface.

5. A plane light source unit according to claim 2, wherein said light output means of said plane light pipe includes slopes facing said incidence side surface at an inclination angle in a range of from 35 to 45 degrees with respect to a reference plane of a light exit surface on a side opposite to said upper or lower surface having said light output means, and flat surfaces inclined at an inclination angle of not larger than 10 degrees so that the projected area of said flat surfaces on said reference plane is not smaller than 8 times as large as the projected area of said slopes on said reference plane.

6. A plane light source unit according to claim 5, wherein the projected width of each of said slopes or short side surfaces of said light output means on said reference plane is not larger than 40 $\mu$m.

7. A plane light source unit according to claim 2, wherein said light output means of said plane light pipe has ridgelines parallel or inclined with an angle range of ±30 degrees with respect to said incidence side surface.

8. A plane light source unit according to claim 2, wherein said light output means of said plane light pipe is constituted by a repetitive structure of prismatic structures disposed at regular intervals of a pitch of from 50 $\mu$m to 1.5 mm.

9. A plane light source unit according to claim 1, wherein said linear light pipe is made of a rectangular parallelepiped having an optical path changing means in a counter surface opposite to said light supply surface of said linear tight pipe, said optical path changing means having slopes inclined in the front-rear direction with respect to a reference plane of said light supply surface.

10. A plane light source unit according to claim 1, wherein said plane light pipe has a refractive index of not higher than 1.54; said linear light pipe has a refractive index of not lower than 1.55; and said plane light pipe and said linear light pipe are connected and integrated with each other.

11. A liquid-crystal display device comprising:
a plane light source unit according to claim 1, and a liquid crystal cell.

12. A plane light source unit comprising:
a plane light pipe including upper and lower surfaces and an incidence side surface which is one of side surfaces between said upper and lower surfaces; and a linear light pipe including a light supply surface and having a refractive index higher than that of said plane light pipe; and at least one point light source being disposed on said linear light pipe, wherein light incident from said at least one point light source is converted into light of a linear light source by said linear light pipe, and wherein said linear light pipe is disposed so as to make said light supply surface face said incidence side surface of said plane light pipe, and light of said linear light source exiting from said light supply surface so as to be incident on said incidence side surface is converted into light of a plane light source by means of said plane light pipe, wherein said plane light pipe includes light output means in one of said upper and lower surfaces to make light incident on said incidence side surface be outputted from the other of said upper and lower surfaces, and said linear light pipe is constituted by a rod-like member having at least six surfaces, namely, upper and lower surfaces, front and rear surfaces and left and right surfaces and further having an optical path changing means in said front surface to thereby make light incident from at least one point light source at either or both of the left and right surfaces exit from said light supply surface constituted by said rear surface, and wherein said light output means of said plane light pipe is constituted by a repetitive structure of prismatic structures each having a combination of a short side surface and a long side surface and disposed at intervals of a pitch of from 50 $\mu$m to 1.5 mm; each of said short side surfaces is made of a slope facing said incidence side surface at an inclination angle in a range of from 35 to 45 degrees with respect to a reference plane of a light exit surface on a side opposite to said upper or lower surface having said light output means; and each of said long side surfaces is made of a slope inclined with respect to said reference plane so that the inclination angle is in a range of from 0 exclusively to 10 degrees, so that the inclination angle difference is not larger than 5 degrees and the inclination angle difference between adjacent ones of said long side surfaces is not larger than 1 degree on a whole surface of said plane light pipe, and so that the projected area of the long side surfaces on said reference plane is not smaller than 8 times as large as the projected area of the short side surfaces on said reference plane.

13. A plane light source unit comprising:
a plane light pipe including upper and lower surfaces and an incidence side surface which is one of side surfaces between said upper and lower surfaces; and a linear light pipe including a light supply surface and having a refractive index higher than that of said plane light pipe; and at least one point light source being disposed on said linear light pipe, wherein light incident from said at least one point light source is converted into light of a linear light source by said linear light pipe, wherein said linear light pipe is disposed so as to make said light supply surface face said incidence side surface of said plane light pipe, and light of said linear light source exiting from said light supply surface so as to be incident on said incidence side surface is converted into light of a plane light source by means of said plane light pipe, wherein said plane light pipe includes light output means in one of said upper and lower surfaces to make light incident on said incidence side surface be outputted from the other of said upper and lower surfaces, and wherein said light output means of said plane light pipe has ridgelines inclined with respect to said incidence side surface.

14. A plane light source unit according to claim 13, wherein said linear light pipe is constituted by a rod-like member having at least six surfaces, namely, upper and lower surfaces, front and rear surfaces and left and right surfaces and further having an optical path changing means in said front surface to thereby make light incident from at least one point light source at either or both of the left and right surfaces exit from said light supply surface constituted by said rear surface.

15. A plane light source unit according to claim 13, wherein said linear light pipe is made of a rectangular parallelepiped having an optical path changing means in a counter surface opposite to said light supply surface of said linear light pipe, said optical path changing means having slopes inclined in the front-rear direction with respect to a reference plane of said light supply surface.

16. A plane light source unit according to claim 13, wherein said optical path changing means has slopes facing the left or right surface and being inclined in the front-rear direction at an angle in a range of from 35 to 45 degrees with respect to a reference plane of said light supply surface.

17. A plane light source unit according to claim 13, wherein said light output means of said plane light pipe includes slopes facing said incidence side surface at an inclination angle in a range of from 35 to 45 degrees with respect to a reference plane of a light exit surface on a side opposite to said upper or lower surface having said light output means, and flat surfaces inclined at an inclination angle of not larger than 10 degrees so that the projected area of said flat surfaces on said reference plane is not smaller than 8 times as large as the projected area of said slopes on said reference plane.

18. A plane light source unit according to claim 17, wherein the projected width of each of said slopes or short side surfaces of said light output means on said reference plane is not larger than 40 µm.

19. A plane light source unit according to claim 13, wherein said light output means of said plane light pipe is constituted by a repetitive structure of prismatic structures each having a combination of a short side surface and a long side surface and disposed at intervals of a pitch of from 50 µm to 1.5 mm; each of said short side surfaces is made of a slope facing said incidence side surface at an inclination angle in a range of from 35 to 45 degrees with respect to a reference plane of a light exit surface on a side opposite to said upper or lower surface having said light output means; and each of said long side surfaces is made of a slope inclined with respect to said reference plane so that the inclination angle is in a range of from 0 exclusively to 10 degrees, so that the inclination angle difference is not larger than 5 degrees and the inclination angle difference between adjacent ones of said long side surfaces is not larger than 1 degree on a whole surface of said plane light pipe, and so that the projected area of the long side surfaces on said reference plane is not smaller than 8 times as large as the projected area of the short side surfaces on said reference plane.

20. A plane light source unit according to claim 13, wherein said light output means of said plane light pipe is constituted by a repetitive structure of prismatic structures disposed at regular intervals of a pitch of from 50 µm to 1.5 mm.

21. A liquid-crystal display device comprising:
a plane light source unit according to claim 13, and a liquid crystal cell.

22. A plane light source unit according to claim 13, wherein said plane light pipe has a refractive index of not higher than 1.54; said linear light pipe has a refractive index of not lower than 1.55; and said plane light pipe and said linear light pipe are connected and integrated with each other.

23. A plane light source unit according to claim 13, wherein said light output means of said plane light pipe has ridgelines inclined with an angle range of from −30 to +30 degrees with respect to said incidence side surface.

24. A plane light source unit according to claim 13, wherein said light output means of said plane light pipe has ridgelines inclined with an angle range of from −25 to +25 degrees with respect to said incidence side surface.

25. A plane light source unit according to claim 13, wherein said light output means of said plane light pipe has ridgelines inclined with an angle range of from −20 to +20 degrees with respect to said incidence side surface.

26. A plane light source unit comprising:

a plane light pipe including upper and lower surfaces and an incidence side surface which is one of side surfaces between said upper and lower surfaces; and a linear light pipe including a light supply surface and having a refractive index higher than that of said plane light pipe; and at least one point light source being disposed on said linear light pipe, wherein light incident from said at least one point light source is converted into light of a linear light source by said linear light pipe, wherein said linear light pipe is disposed so as to make said light supply surface face said incidence side surface of said plane light pipe, and light of said linear light source exiting from said light supply surface so as to be incident on said incidence side surface is converted into light of a plane light source by means of said plane light pipe, and wherein said plane light pipe has a refractive index of not higher than 1.54; said linear light pipe has a refractive index of not lower than 1.55; and said plane light pipe and said linear light pipe are connected and integrated with each other.

27. A plane light source unit comprising:

a plane light pipe including upper and lower surfaces and an incidence side surface which is one of side surfaces between said upper and lower surfaces; and a linear light pipe including a light supply surface and having a refractive index higher than that of said plane light pipe; and at least one point light source being disposed on said linear light pipe, wherein light incident from said at least one point light source is converted into light of a linear light source by said linear light pipe.

wherein said linear light pipe is disposed so as to make said light supply surface face said incidence side surface of said plane light pipe, and light of said linear light source exiting from said light supply surface so as to be incident on said incidence side surface is converted into light of a plane light source by means of said plane light pipe, and wherein the plane light pipe is made of a material exhibiting a refractive index of not lower than 1.45 and not higher than 1.54, and the linear light pipe is made of a material exhibiting a refractive index of not lower than 1.55 and not higher than 1.65.

* * * * *